United States Patent [19]

Pitts, Jr.

[11] Patent Number: 5,591,317

[45] Date of Patent: Jan. 7, 1997

[54] ELECTROSTATIC DEVICE FOR WATER TREATMENT

[76] Inventor: M. Michael Pitts, Jr., 6651 N. Campbell Ave., No. 171, Tucson, Ariz. 85718

[21] Appl. No.: 197,154

[22] Filed: Feb. 16, 1994

[51] Int. Cl.⁶ .................. C25B 11/00; B03C 5/00
[52] U.S. Cl. .......................................... 204/667
[58] Field of Search .................. 204/302, 303–308, 204/667, 668, 669

[56] References Cited

U.S. PATENT DOCUMENTS

| | | | |
|---|---|---|---|
| 3,585,122 | 6/1971 | King | 204/302 |
| 4,024,047 | 5/1977 | Clark et al. | 204/302 |
| 4,073,712 | 2/1978 | Means et al. | 204/186 |
| 4,199,430 | 4/1980 | McMahon | 204/302 |
| 4,217,337 | 8/1980 | Yamada et al. | 423/626 |
| 4,272,500 | 6/1981 | Eggerding et al. | 423/327 |
| 4,545,887 | 10/1985 | Arnesen et al. | 204/280 |
| 4,886,593 | 12/1989 | Gibbs | 204/302 |
| 4,902,390 | 2/1990 | Arnesen | 204/149 |
| 5,437,844 | 8/1995 | Bonner | 422/186 |
| 5,458,856 | 10/1995 | Marie et al. | 422/186 |

*Primary Examiner*—Arun S. Phasge
*Assistant Examiner*—William T. Leader
*Attorney, Agent, or Firm*—Antonio R. Durando

[57] ABSTRACT

An electrostatic-field generator that consists of a vitrified ceramic tube of unibody construction having a single open end adapted to receive a high-voltage power cable through an insulated cap. The interior surface of the ceramic tube is lined with a layer of conductive material electrically connected to the power cable, thereby providing a relatively-large conductive surface in intimate contact with the dielectric surface of the ceramic tube. In operation, the device is immersed in a body of water connected to ground and the power cable is energized with a high DC voltage, thereby creating an electrostatic field across the dielectric of the tube's ceramic and across the body of water. Because of the difference in the dielectric coefficients of the materials, the majority of the applied potential is measured across the water, thus providing the desired electrostatic effect on its particulate components.

16 Claims, 4 Drawing Sheets

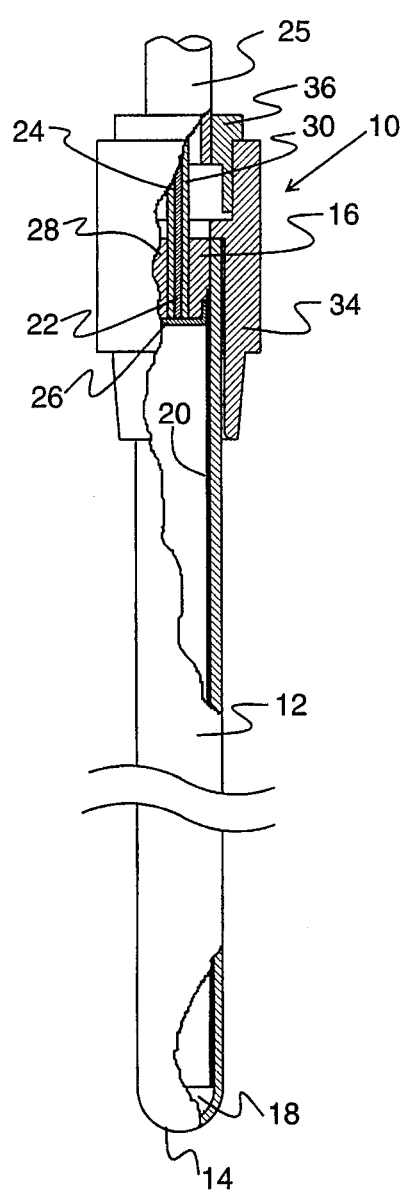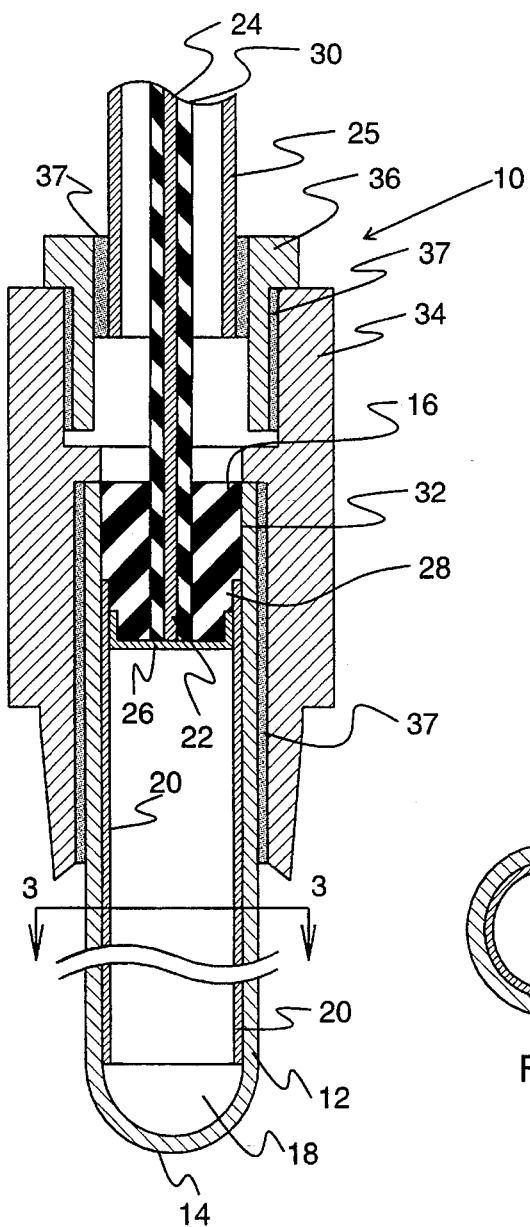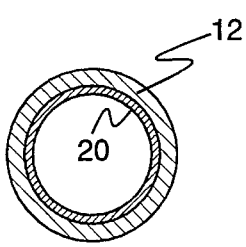

ELECTROSTATIC DEVICE FOR WATER TREATMENT

BACKGROUND OF THE INVENTION

1. Field of the Invention

This invention is generally related to methods and apparatus for electrostatic treatment of water streams for improving particulate dispersions. In particular, the invention describes a device of novel construction that allows reliable operation at much higher voltages, and correspondingly with higher efficiencies, than previously reported.

2. Description of the Related Art

All water systems are commonly subject to reduced efficiency and failure as a result of scaling and clogging by solid particles suspended in the aqueous medium. As a means for reducing these problems, the concept of treating the water by inducing an electrostatic field across it has been known for many years and many devices have been utilized with varying success, both for industrial and domestic applications.

Solids accumulation is a particularly severe problem in solvent extraction circuits, such as in mining operations and other large-scale industrial applications, wherein suspended solids bind to form masses of sludge that decrease the efficiency and inhibit the operation of the equipment. It has been found that the degree of accumulation depends on the particulate content of the water, the operating conditions of the circuit, and the type of process involved (such as, for example, a particular leaching technique). The sludge consists principally of silicate mineral matter bound by organic components dispersed in water. Most solids enter the system in suspension and some precipitate while passing through, causing scaling and accumulation of sludge. Regardless of the particular nature of the water circuit, the presence of accumulated sludge invariably results in increased operating expenses and additional capital costs associated with control efforts.

For some time researchers have known that the surface charge of particles in suspension can be altered by exposure to high-potential electrostatic fields. A particulate dispersion is improved as a result of elevated levels of induced like charges on the surface of sub-micron particles that yield mutual repulsion of the particles. Similarly, the particles may become attracted by exposure to various levels of charge intensity that yields reduced repulsion among them. This phenomenon forms the basis for well known applications, such as in electrostatic precipitators, photocopiers, and certain paint spraying techniques. U.S. Pat. Nos. 3,585,122 (1971) to King and No. 4,073,712 (1978) to Means et al. describe water-treatment electrostatic systems of the type addressed in this disclosure. Means et al. discuss in detail many of the fundamental principles underlying the effects of electrostatic fields on particle suspensions in water and describe a device for efficiently inhibiting scale formation in a hot-water system. The patent discloses an analytical approach to the design of water treatment apparatus having two tubular electrodes mounted in concentric spaced relation to form a series of three capacitors (two dielectric materials surrounding a body of water therebetween) subjected to a high-voltage DC electrostatic field. The preferred dielectric materials consist of thin layers of polytetrafluoroethane (PTFE, also known commercially under the registered trademark TEFLON) and aluminum oxide, each having a dielectric coefficient sufficient to ensure that most of the electrostatic field intensity is applied across the body of water. Similarly, in U.S. Pat. Nos. 4,545,887 (1985) and No. 4,902,390 (1990), Arnesen et al. describe electrostatic electrodes for a storage tank of a water system also based on the use of PTFE heat shrunk over a conductive tube.

In all devices found in the prior art, the water to be treated is subjected to an electrostatic field created by insulated electrodes arranged to produce a series of capacitive layers between them. Given the very high voltages applied to the electrodes (the device described by Means et al. is most commonly operated at about 10,000 DC volts), the integrity and strength of the insulation between the water and at least one of the electrodes is crucial for the continued operation of a system. Any breakdown of the dielectric layer causes a short through the water body and the inevitable shutdown of the system. Therefore, all known devices are constructed so as to ensure the integrity of the dielectric material used to insulate the usually positive electrode. This is achieved in all cases by enveloping a tubular metallic electrode in a Teflon® sleeve that is heat shrunk around the outer surface of the electrode and by sealing each end of the resulting insulated electrode with protective dielectric bushings. Thus, this process provides a seamless insulating layer of Teflon® around the metallic electrode and ensures intimate contact between the two materials. Such intimate contact is very important because any air space left between the metal and the dielectric, such as by blisters or bubbles in the dielectric layer, causes electrical arcing between the two that eventually perforates the Teflon® layer, shorts the electrode to the water body, and greatly reduces the electrostatic efficiency of the device. Moreover, a large air space would form yet another dielectric layer within the system, which is undesirable because of the very low capacitance of air that would greatly reduce the overall capacitance of the system.

In all cases, the objective of an electrostatic device is to apply the maximum electrostatic field across the fluid being treated. This goal is based on the assumption that the surface charges of organic and inorganic particles in the water are the responsible mechanisms promoting agglomeration and aggregation of sludge mass. It follows that anything done to alter the charge differentials that promote bonding of suspended particles with organic compounds serves to establish a more stable dispersion of solids. Since, for a given type of apparatus, the electrostatic field across the water medium is proportional to the potential applied to the system, it is desirable to apply as high a voltage as possible within the tolerances of the apparatus. Higher voltages have been found to be more effective, at times essential, for treating waters with high dissolved or suspended solid concentrations (such as with more than 1,000 ppm total dissolved solids) which have been shown to be totally unaffected by the apparatus of the prior art. The inefficiency of these devices is explained by the fact that the effective dielectric constant of water increases with increased content of dissolved solids. The result is a reduction of the voltage gradient in the water that can drop below the critical level necessary for producing a successful colloidal dispersion, which is the mechanism for scale or sludge deposit reduction. For a given water quality and flow rate, there is a critical field intensity below which no electrostatic effect is noted.

The devices of the prior art are limited in their application by twofold problems. Because of its well-known physical properties, PTFE material is not suitable for adherence to the surface of metal conductors other than by the heat-shrink process described in the referenced patents. Any attempt to cover an electrode with Teflon® by a process other than heat-shrinking (such as would be required for an electrode having a non-cylindrical shape) would necessarily compel the formation of seams and connections that would be very hard to achieve and prone to breakdown during use. In addition, because of the material's non-stick properties, it would be very difficult to avoid the formation of air spaces between the metal and the dielectric surfaces. Accordingly, the preferred structure of such electrostatic devices is cylindrical, as described above, wherein each end of the insulated tube is sealed by means of separate dielectric bushings. Under normal stresses of operation, the connection between the tube and these end bushings has been the source of leaks that allow the water medium to come into contact with the high-voltage metallic tube and cause a complete system breakdown. U.S. Pat. Nos. 4,024,047 (Clark et al.) and No. 4,199,430 (McMahon) provide some solutions toward improving the water-tight connection between the electrostatic tubes and the end caps, but still require the use of separate end components. Therefore, it would be desirable to have an electrostatic device of such physical configuration that potential sources of leaks between the water body and the high-voltage metal core are minimized.

Another problem is related to the thickness of the dielectric material utilized in the prior art. In order to optimize its capacitance, the layer of Teflon® used to coat the positive electrode is kept to a minimum (Means et al. disclose five to twenty-five thousands of an inch as the preferred thickness). This causes the dielectric layer to be more vulnerable to imperfections of construction that might cause arcing or other operating stresses that could result in interruption of insulation. As a result of these constraints, the devices of the prior art are not suitable for efficient and dependable operation at voltages higher than approximately 10,000 volts, beyond which they quickly experience breakdowns. This characteristic prevents their utilization for large water-treatment systems and for waters containing high concentrations of dissolved solids, both of which require very high electrostatic potentials applied across the water body in order to process high-volume throughputs.

Because of these practical problems, the concept of applying an electrostatic field to a water suspension to effect its physical characteristics has been exploited only in relatively small water treatment systems (i.e, low throughput and/or low solid content), such as described in the referenced patents. Therefore, there is still a need for an improved electrostatic device that is operable at very high voltages with reliability and safety. In particular, there is a need for an electrostatic device that is not susceptible to total breakdown as a result of breakage or interruptions in the dielectric integrity of the material.

SUMMARY OF THE INVENTION

One objective of this invention is an electrostatic device for use in large-scale water treatment systems that require the application of very high DC voltages for efficiency of operation.

Another goal of the invention is a device that utilizes a dielectric material capable of withstanding the very high voltages required for large-scale water systems and, at the same time, efficiently transferring the electrostatic field intensity across the water body.

Yet another goal of the invention is a device that is not susceptible to shutdowns as a result of imperfections of construction that cause arcing between the conductive and dielectric layers thereof.

Another objective is a device that minimizes the use of insulating bushings to prevent contact between the conductive metallic layer of the device and the water medium surrounding it.

Still another objective is a device comprising a dielectric layer that is abrasion and corrosion resistant for durability and dependability during use in an industrial environment.

A final objective is a device that can be manufactured and assembled at low cost according to the above-stated criteria. This is achieved by using commercially available components and materials, modified only to the extent necessary to fit the requirements of the invention.

Therefore, according to these and other objectives, the electrostatic device of the present invention consists of a vitrified ceramic tube of unibody construction having a single open end adapted to receive a high-voltage power cable through an insulated cap. The interior surface of the ceramic tube is lined with a layer of conductive material electrically connected to the power cable, thereby providing a relatively-large conductive surface in intimate contact with the dielectric surface of the ceramic tube. In operation, the device is immersed in a body of water connected to ground and the power cable is energized with a high DC voltage, thereby creating an electrostatic field across the dielectric of the tube's ceramic and across the body of water. Because of the difference in the dielectric coefficients of the materials, the majority of the applied potential is measured across the water, thus providing the desired electrostatic effect on its particulate components.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

BRIEF DESCRIPTION OF THE DRAWINGS

FIG. 1 is an elevational partially cut-out view of an electrostatic device according to the present invention.

FIG. 2 is a more detailed, elevational cross-sectional view of the device of FIG. 1.

FIG. 3 is a top cross-sectional view of the same device as seen from line 3—3 in FIG. 2.

DESCRIPTION OF THE PREFERRED EMBODIMENT

Figure 4:
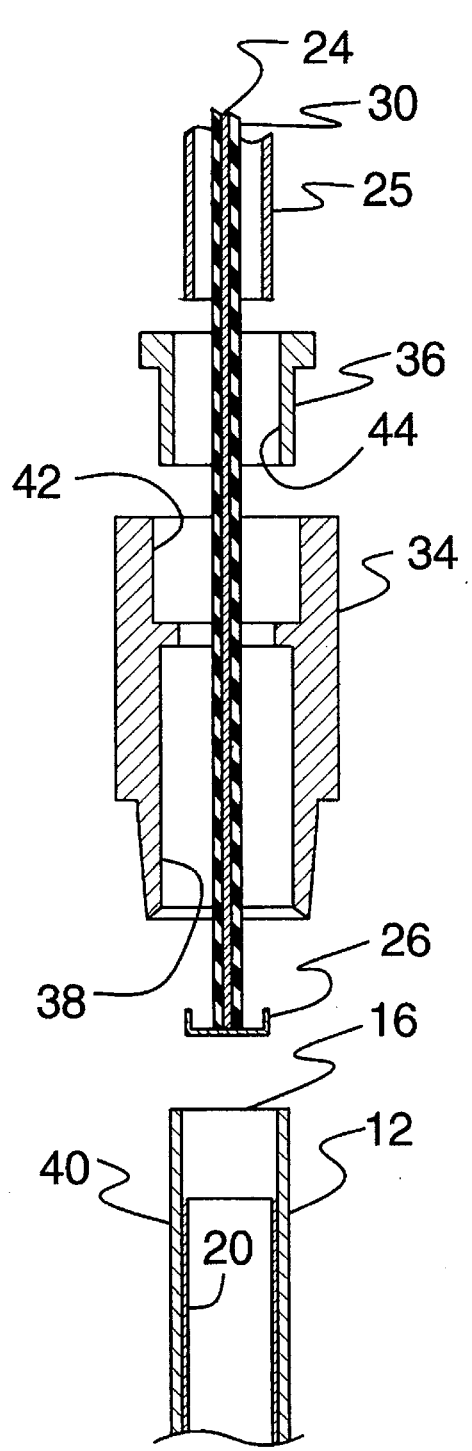
FIG. 4 is an exploded view of the open-end portion of the device shown in FIG. 3.

Historically, the availability of Teflon® as a dielectric material enhanced the commercialization of electrostatic water-treatment technology. Nevertheless, as mentioned above, certain properties of the material imposed limits on the design of electrostatic installations constraining the size and difficulty of applications that could be engineered. Thus, small water systems (low throughput) and simple water chemistry have been the domain of electrostatic water-treatment to date.

One of the most important inventive features of this disclosure is the realization that vitrified ceramic materials (porcelains) provide a basis for addressing many of the problems heretofore unsolved for high-voltage applications. Instead of utilizing an insulated inner metal tube as the supporting structure of the electrostatic device, wherein the dielectric layer consists of thin and relatively weak material around the tube, the electrostatic-field generator of the invention uses an outer tube made of vitrified ceramic material, which is much stronger than Teflon®, as both the insulating and bearing structure of the device. Because of its method of manufacture, a vitrified ceramic tube may be formed in unibody construction with a sealed end, thereby eliminating the need for a sealed, dielectric cap at that end.

Although ceramic materials have been recognized for decades as superior dielectrics, manufacturing techniques for forming seamless vitrified ceramic tubing of high-voltage capacitor quality have been developed only recently. Therefore, until the last decade there has been no economical substitute to Teflon® or other non-bearing materials (such as plastics) for building electrostatic-field generators. Thus, as explained above, all commercial production of electrostatic-field electrodes has been based on Teflon® sheathing heated and shrunk onto a metal tube and generator designs have mostly focused on successful techniques for sealing the ends of the Teflon®-covered metallic tube to ensure long-term protection from leaks that would cause short-circuiting of the electrical connections. Thus, although some prior art patents (Means et al. and McMahon) list ceramics among the possible dielectric materials available for the embodiments disclosed, the application of ceramic as a powder, paste or tile to a metal tube, as suggested by them, would not achieve the dielectric integrity required for a very-high-voltage electrostatic-field generator, which is instead achieved by the use of vitrified ceramics.

Since in operation each electrostatic-field generator system also comprises a negative electrode in contact with the liquid body, whether or not also insulated by a dielectric layer such as anodized aluminum, the electrostatic system consists of multiple capacitive layers in series (for example Teflon®, water and anodized aluminum) over which the applied electrostatic potential and field intensity are distributed. Focusing on the first capacitive body of the series provided by the dielectric material in the generator, it consists substantially of a parallel-plate capacitor. Therefore, given a certain static potential applied to the system, the field intensity across the first dielectric material is inversely proportional to its dielectric coefficient, as taught by basic physics. Thus, a higher dielectric coefficient results in a lower field intensity across it and a corresponding shift of the available electrostatic field to the body of water.

At the same time, I found that higher dissolved-solid concentrations in water also result in a higher effective dielectric coefficient for the body of water (tap water typically has a dielectric coefficient of approximately 80). For a given applied voltage, this results in a lower field intensity through the water which, in turn, may result in the field's effect on the dispersed particles being insignificant. This shift in the dielectric coefficient of the water body as a function of total dissolved solids, which is not recognized in the prior-art literature related to water treatment, is the significant point that contributes to poor performance of known devices in water with high concentrations of dissolved solids and is the fundamental justification for higher voltage applications. Thus, thicker layers of dielectric materials having a higher dielectric coefficient are used to provide structural strength to the device of the invention, such materials also having a dielectric strength sufficient to maintain total insulation of the system as required to ensure an effective electrostatic field across the body of water. These criteria are met by the vitrified ceramics utilized for this invention, which provide high mechanical strength as well as the required dielectric-strength and dielectric-coefficient properties. Typically, the dielectric coefficient of vitrified high-alumina ceramics (porcelains) is in the 9.0 to 9.4 range, as compared to a value of 2.1 for Teflon®; similarly, these ceramics' dielectric strength is approximately 300–320 volts/mil, as compared to 200 volts/mil for Teflon®.

Referring to the drawings, wherein like parts are designated throughout with like numerals and symbols, FIG. 1 illustrates in elevational schematic view the various components of an electrostatic device 10 according to the present invention. As also shown in more detail in FIGS. 2 and 3, the device 10 consists of a ceramic tube 12 preferably of unibody construction and having a distal integrally-sealed end 14 and a proximal open end 16. The interior surface 18 of the tube 12 is lined with a layer of conductive material 20, such as aluminum or copper foil, disposed in intimate contact with the surface 18 in order to minimize the presence of gaps or air spaces therebetween. Depending on the material and process used to coat the interior of the ceramic tube, the inside of the sealed end 14 may or may not also be lined (it is shown as not lined in the figures), the capacitive effect of the tube being related to the overall surface of the conductive material 20, as one skilled in the art would recognize.

The end 22 of an appropriately insulated high-voltage cable 24 contained in protective conduit 25 is electrically connected to the conductive material 20 inside the tube 12. A conductive bushing 26, attached to the end 22 of the cable and press-fitted or otherwise connected to the conductive material 20, may be used to provide electrical contact between the two, but any equivalent method or device, such as by welding, would be suitable to practice the invention. This electrical connection is shown near the open end 16 of the ceramic tube in the figures, but it could be effected at any place along the inner length of the tube with equivalent result inasmuch as the entire surface of the conductive material 20 is obviously energized by the connection. Most importantly, though, the open end 16 must be sealed by nonconductive, preferably resilient, adhesive material 28 (such as silicone, latex, or rubber) that is tightly packed or molded (potting) between the insulating sheath 30 of the cable and the interior wall of the open end 16. Preferably, an outermost annular portion 32 of the interior wall of the open end 16 is not covered with the conductive material 20, so as to provide a continuous dielectric barrier at that end formed by the nonconductive material 28 filling the space between the cable sheath 30 and the ceramic tube 12.

Finally, as shown particularly in FIG. 4, the open end 16 of the ceramic tube 12 is hermetically capped by a mounting fixture 34 adapted for tight water-proof fit with the end 16 on one side and with a cable connector 36 on the other side. The specific shape and characteristics of the fixture 34 and connector 36 are not important for the invention so long as they are adapted to protect the open end 16 of the ceramic tube from penetration of liquid from the outer body of water in which the device is immersed during use. Thus, the gap between the female surface 38 of the fixture 34 and the male surface 40 of the tube 12 fitted thereto, whether by screwable or other type of engagement, must be perfectly sealed for long-term operation of the device. The same is true for the gap between the female surface 42 of the fixture 34 and the male surface 44 of the connector 36. Silicone or other insoluble, preferably resilient, sealing material 37 may be used to ensure water-tight coupling while making the various connections.

Figure 5:
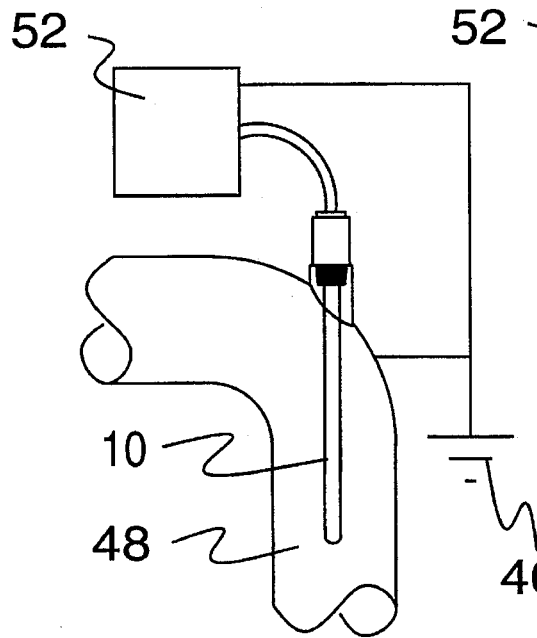
FIG. 5 is a schematic view of the device of the invention in use in a pipe-elbow arrangement of a large scale water-treatment system.
Figure 6:
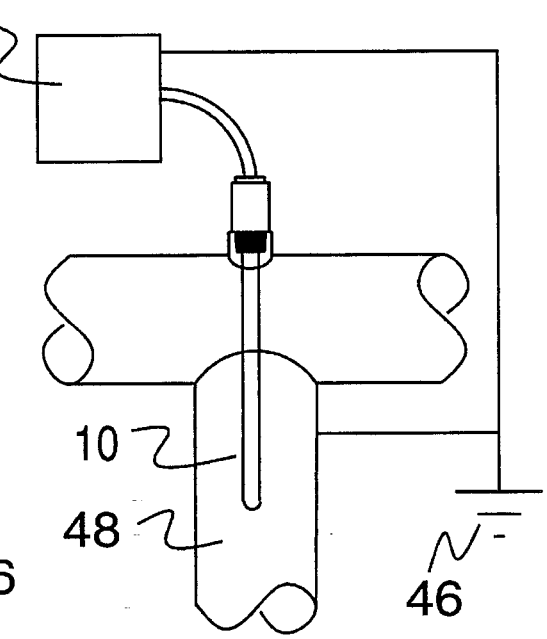
FIG. 6 is a schematic view of the device of the invention in use in a pipe-tee arrangement of a large scale water-treatment system.
Figure 7:
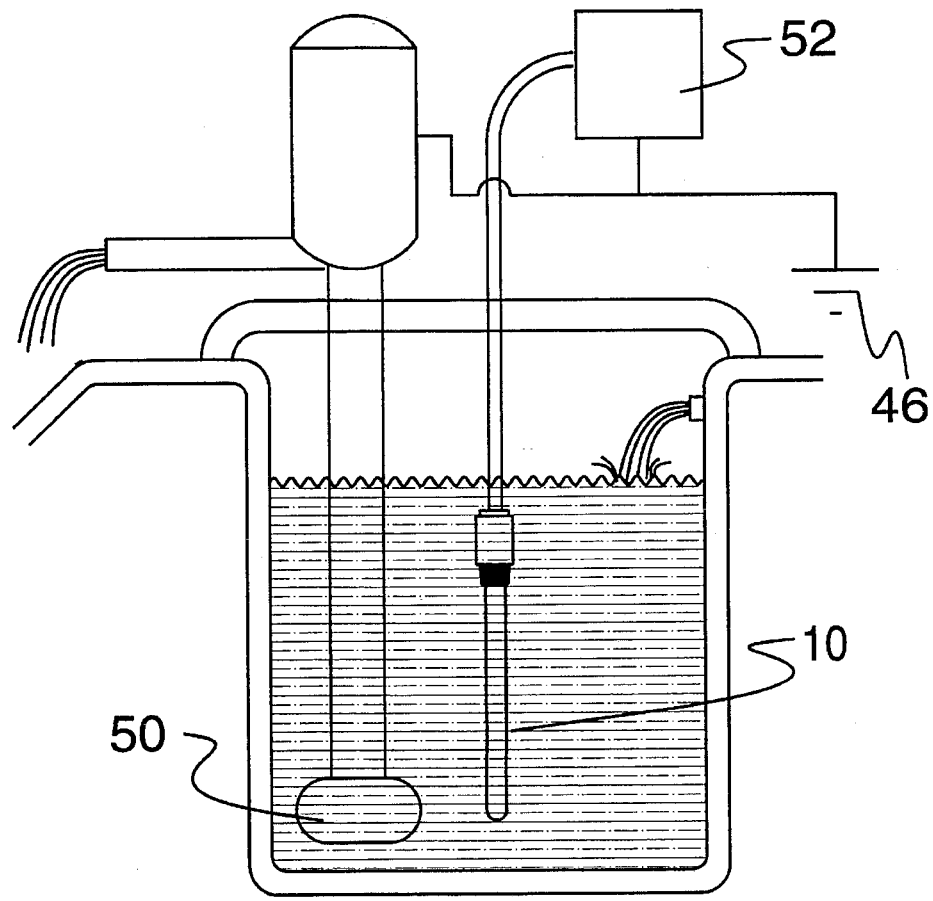
FIG. 7 is a schematic view of the device of the invention in use in a sump tank arrangement of a large scale water-treatment system.

As described, the outer ceramic tube 12 and the inner lining of conductive material 20 connected to a high-voltage positive power source provide a sound alternative to the electrostatic field generators of the prior art. As illustrated schematically in FIGS. 5–7, in operation the device 10 is immersed in a body of water which is connected to a ground 46 either directly or through an electrode immersed in the water at a distance from the device. Such grounded electrode may consist of piping 48, as seen in FIGS. 5 and 6, or a pump or other metallic equipment 50, as seen in FIG. 7. Depending on the water throughput and particulate content, the distance between the device 10 of the invention and the grounded electrode is adjusted to provide the electrical field required to cause the intended electrostatic effect on the particles dispersed in the water. The apparatus of the invention was tested and found to be very effective at a distance of approximately 2–3 inches, but theoretical calculations based on prior-art knowledge show that it could be operated successfully at distances in excess of 10 feet in waters with up to 3,000 ppm of total dissolved solids. When the conductive material 20 is energized from a power source 52 with a high positive voltage, the dielectric properties of the ceramic tube 12 insulate it from ground, creating an electrostatic field across the tube and the water body. As desired, because of the difference between the dielectric constant of the ceramic and that of the water, the majority of the electrostatic field affects the water body. The configuration of the device 10 allows operation at very high voltages (the apparatus has been tested at up to 50,000 volts and can be designed for much higher voltages, if necessary), which in turn makes it possible to effectively utilize it in large-scale applications.

Figure 8:
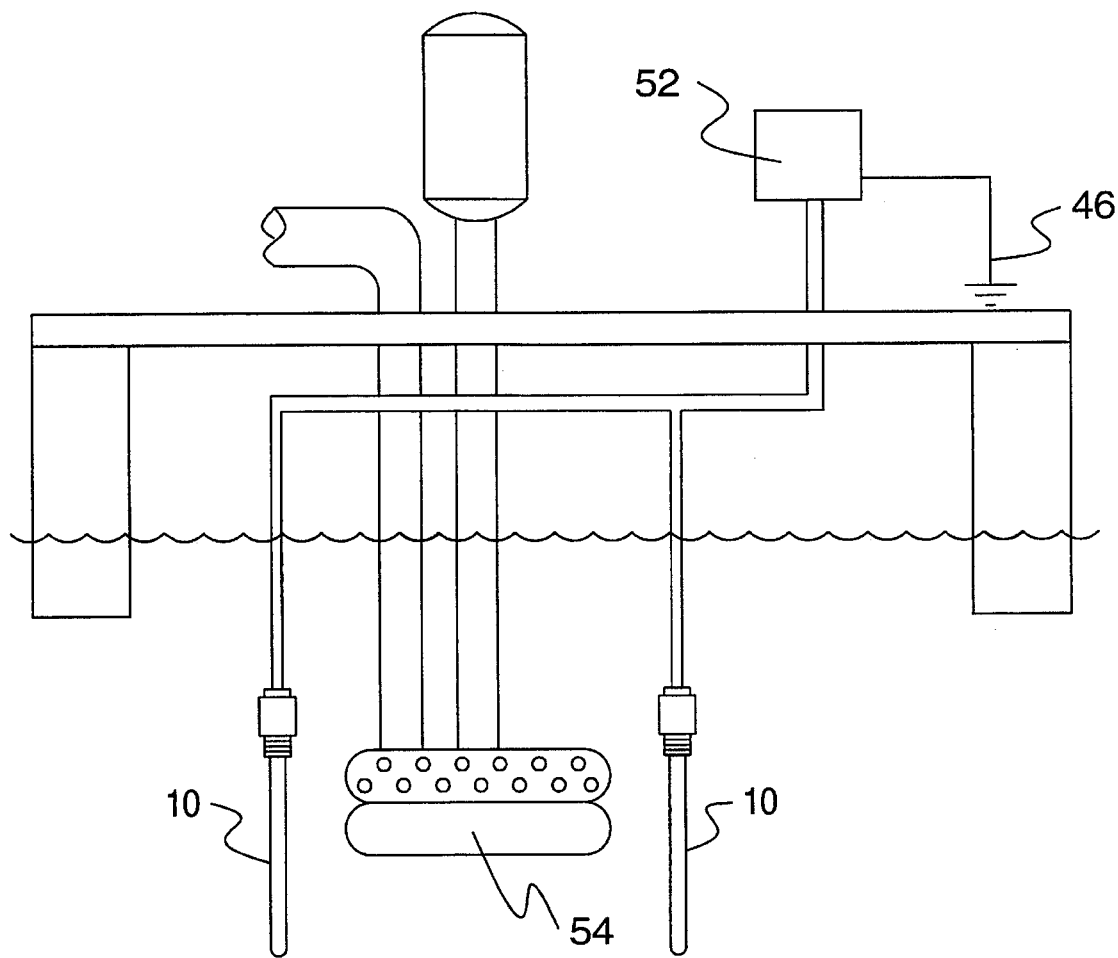
FIG. 8 is a schematic view of the device of the invention in use in a multi-unit floating arrangement of a large scale water-treatment system.

FIG. 8 illustrates an open-field application where multiple devices 10 are used in a floating arrangement in a pond in conjunction with a grounded submerged pump 54. Multiple electrostatic generators 10 are disposed in star arrangement so as to cover the entire space surrounding the inlet of the pump 54 to ensure adequate exposure (sufficient residence time) of all liquid being pumped through the electrostatic field produced by the system at a field intensity greater than the critical level required to improve particle dispersion. Depending on the quality of the water being treated and the operating voltage of the electrostatic system, the distance between each electrostatic generator 10 and the grounded electrode (such as the pump 54) is chosen so as to optimize efficiency and throughput. In a system operating at about 30,000 volts in a water stream providing a residence time of at least 5 seconds, a distance of between 1 and 10 feet was found to produce great scale- and sludge-formation improvements over any apparatus of the prior art.

Another important inventive part of the device of the invention is the idea of assembling the conductor/dielectric layer combination in such a way that the weaker link is not in contact with the water being treated. In the devices of the prior art, a structurally weaker Teflon® layer separates the water from a stronger metallic tube. In case of any failure of the dielectric layer, the high-voltage tube becomes immediately shorted and the system breaks down. In particular, this may be caused even by pin-sized gaps between the surfaces of the tube and the Teflon® heat-shrunk around it. When subjected to an electrostatic field, arcing occurs across these gaps causing hot spots that eventually perforate the thin dielectric layer and completely disable the system. Since the severity of arcing is a function of the potential applied to the system, this problem severely limits the voltage at which the prior-art apparatus may be operated.

The device of the invention, on the other hand, provides a weaker metallic lining inside a stronger ceramic tube. If the lining is damaged, such as by arcing resulting from air gaps, discontinuities are created in the conductive material, rather than in the dielectric layer, and the high-voltage portion of the device remains insulated from the surrounding water. Therefore, other than by having a negligible effect on the capacitance of the system, these kinds of problems do not affect the continued viability and operation of the electrostatic device. Accordingly, very high voltages do not constitute a potential source of total breakdown, as in the case of prior-art apparatus.

The device of the invention was tested in reclaimed mill water at a mining operation in New Mexico with water containing about 3,200 ppm of total dissolved solids. The performance of the device was also compared to prior-art equipment that is currently being used successfully in water treatment applications having less than 1,000 ppm total dissolved solids, such as boiler and cooling-tower applications. This equipment uses a Teflon®-coated electrode operating at about 10,000 volts.

The device of the invention was immersed in a vessel where the water was flowing at a rate fluctuating between 1.5 and 3 gpm, placed at a distance of approximately 2.5 inches from a grounding connection (the walls of the vessel itself). The device was energized at approximately 30,000 volts and operated continuously for about 260 hours without failure. Its effect on the quality of the water being treated, as measured by the formation of scale on conventional test equipment, was greatly superior to that of the other apparatus tested for an equivalent period of time on the same water system. The amounts of scale deposited by water flowing downstream of the treatment location over the test period using the device of the invention and a commercial electrostatic generator (a Model WTCS, manufactured by Electrostatic Technologies Inc. of Kansas City, Mo., considered to be the best electrostatic-field generator commercially available to date) were compared. This commercial generator consists of a Teflon® wrapped metallic tube and operates at about 10,000 volts. The deposit formation was found to be approximately seven times larger with the prior-art equipment than with the device of the invention. Moreover, the prior-art equipment did not show any significant improvement over the rate of scaling of untreated water, supporting the hypothesis that higher operating voltages are required for large-scale industrial applications. Most importantly, though, when attempts were made to operate prior-art equipment at higher voltages in water of comparable quality, again no visible effects were noted. An electrostatic generator Model WT 600, manufactured by the same company and designed for operation at 30,000 volts, showed no improvement in water containing about 3,000 ppm of total dissolved solids. This is explained by the fact that the Teflon® layer had to be increased substantially in order to withstand the higher voltage (either by using two layers of Teflon® heat shrunk around the metallic electrode or by increasing the thickness of a single layer). Because of the relatively low dielectric coefficient of Teflon® in comparison to ceramics (2.1 versus about 9.4), a thicker layer of Teflon® produces a greatly reduced electric field across the water body, such that particle charge is not induced even at higher operating voltages.

In view of these results, it is anticipated that the device of this invention can be utilized to apply electrostatic technology to large water-flow systems with difficult scale or deposit formation problems. For example, the device could be used to reclaim water systems of sulfide ore concentrators, control interphase sludge formation common to solvent extraction circuits, and to maintain clean turbine-condenser conditions for heat rate enhancement in utility and industrial power generation stations.

The use of vitrified high-alumina ceramics (typically greater than 99.5 percent $Al_2O_3$), or any of a number of other formulations such as a vitrified mullite (also a porcelain) containing less alumina and more silica, is recommended for the application of this invention. Note that ceramics having as low as 50 percent alumina can be used to practice the invention, but their mechanical as well as electrical properties are much less desirable for high-voltage applications. As explained, these materials have the following desirable properties which, in combination, provide the improvements of this invention:

1. High dielectric strength, which permits the use of very high voltages;

2. High dielectric coefficient, which enhances the electrostatic field intensity in the water body;

3. Seamless, nonporous construction of the electrode, which minimizes the potential for water leaks;

4. Mechanical strength, which permits its use as a bearing structure and its lining with non-bearing conductive material, thereby eliminating the potential for failure by air bubble arcing. This strength also permits the use of relatively thin walls without fear of breakage during operation.

Figure 9:
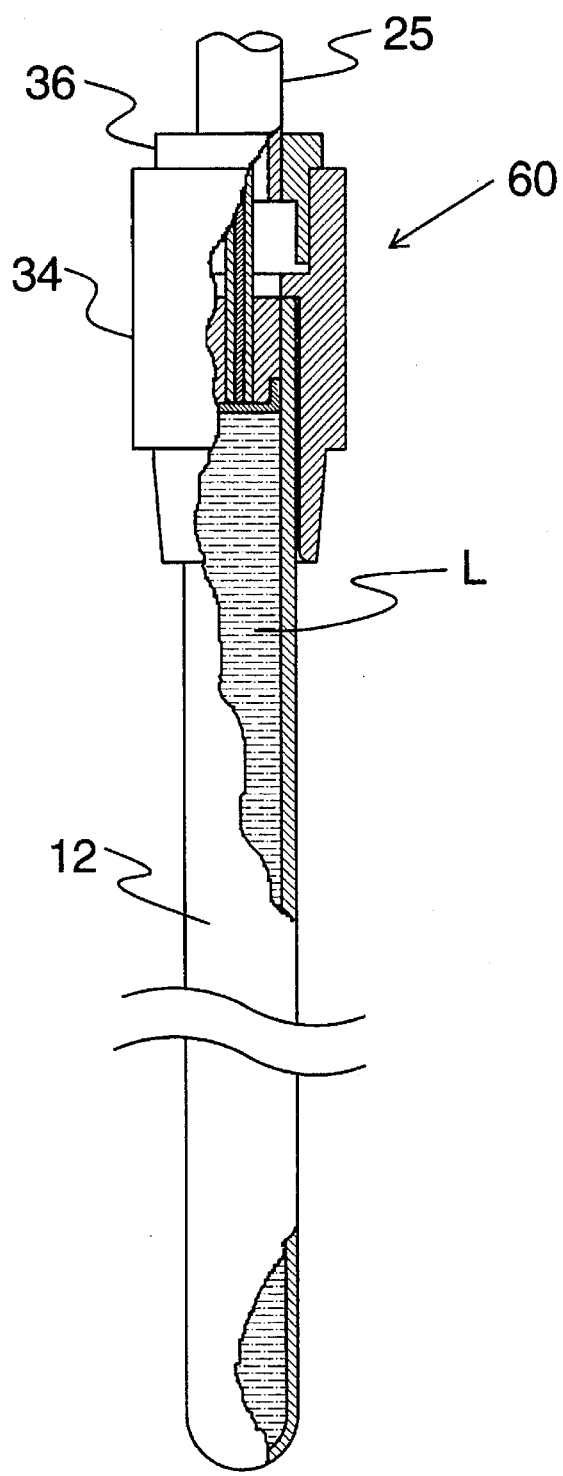
FIG. 9 is a schematic view of an alternative embodiment of the device of the invention wherein the metallic conductive layer is replaced with a conductive liquid solution.

5. Versatility of design options based on the ceramic tube dimensions and precise composition. In addition, these ceramics have great physical strength, high abrasion and corrosion resistance, and may be assembled at relatively low cost, which all contribute to their diversity and flexibility of application. Thus, a strong and efficient electrode for this invention can be built by using a ceramic tube that has been cast and fired with one end closed. The high-alumina class of ceramics used is impervious to fluids and possesses the required structural strength for use as a bearing member. The conductor, as opposed to prior-art systems, is not a bearing structure but serves only to distribute the unipolar charge; accordingly, it may consist simply of a thin layer of material bonded to the inner surface of the tube. Because there is no structural role for the conductor, materials may be chosen to suit the operating environment or to obtain low cost or ease of construction. The conductor may be a thin layer of metal foil, such as copper or aluminum, bonded to the inner wall of the tube with a conductive adhesive; or it may be a conductive adhesive alone, such as an epoxy or acrylic, containing silver or nickel. Alternatively, the conductive layer may be pressed onto the inner surface of the ceramic tube, or sprayed by plasma metallization, or it may be applied as a conductive ceramic glaze (or even electroplated over such a glaze coating). Since there is no requirement for transmission of high levels of current, the conductor can be a very thin or even a relatively inefficient conductor. A conductive liquid, such as a concentrated solution L of copper sulphate completely filling the cavity within the ceramic tube, would also provide a suitable conductor (illustrated in the embodiment 60 of FIG. 9). The principal requirement is that the contact between the conductive layer and the dielectric material be as perfect and gap-free as possible to avoid void spaces with a low dielectric coefficient that would reduce the overall efficiency of the capacitor system.

The preferred embodiment of the invention was manufactured for testing in the mining operation environment described above. The ceramic tube 12 was about 30 inches long and fit in an arbitrarily-chosen 6-inch ID pipe; it had an outside diameter of approximately 1 and ¼ inches with a wall thickness of about ⅛ of an inch. As illustrated above, the tube was lined with copper foil mechanically attached to its inside wall 18. The lining was connected to the cable 24 by means of the conductive bushing 26 and the open end 16 of the tube was then potted with silicone material 28. Finally, the various other components were connected to the mounting fixture 34 and sealed with a layer of epoxy 27 for durable impermeable operation.

Other than specifically described, the invention can obviously take other shapes with equivalent functionality and utility. For example, the device could easily be modified to have a tubular shape other than cylindrical. Similarly, the ceramic tube could have any dimension suitable for the requirements of a specific application. In fact, any shape or size that is not specifically described as critical for any of the components is acceptable to practice the invention so long as it retains the functional characteristics described in this disclosure.

Thus, various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

I claim:

1. An electrostatic-field generator for use in reducing scaling from water with a high dissolved-solid content, comprising:

(a) a vitrified ceramic tube of unibody construction having an integrally-sealed end defining an inner cavity with an inner wall;

(b) conductive material contained within said inner cavity and disposed in intimate contact with said inner wall;

(c) electrically-insulated sealing means for providing hermetic closure to said inner cavity; and (d) electrical means for energizing said conductive material with a static electromotive force, said electrical means being adapted for creating an electrostatic field between said generator immersed in the water and an electrical ground.

2. The generator of claim 1, wherein said vitrified ceramic tube has a circular cross-section.

3. The generator of claim 1, wherein said conductive material consists of a metallic foil bonded to said inner wall by means of conductive adhesive.

4. The generator of claim 1, wherein said conductive material consists of a conductive liquid solution completely filling said inner cavity.

5. The generator of claim 1, wherein said electrically-insulated sealing means consists of nonconductive, adhesive material sealing said inner cavity.

6. The generator of claim 5, wherein said nonconductive, adhesive material consists of silicone.

7. The generator of claim 1, wherein said electrical means for energizing said conductive material consists of an insulated cable electrically connected thereto and adapted to be connected to a power supply in closed circuit with said electrical ground.

8. The generator of claim 7, wherein said insulated cable is electrically connected to said conductive material by means of a conductive bushing attached to the cable and electrically connected to the conductive material.

9. The generator of claim 8, wherein said electrically-insulated sealing means for providing hermetic closure to said inner cavity consists of nonconductive material tightly packed within said inner cavity around said insulated cable.

10. The generator of claim 7 wherein said power supply is adapted to provide a voltage greater than 10,000 volts in closed circuit with said electrical ground.

11. The generator of claim 1, wherein said vitrified ceramic tube is manufactured with a vitrified ceramic having at least 50 percent alumina and having a dielectric coefficient greater than approximately 9.0.

12. The generator of claim 1, wherein said vitrified ceramic tube is manufactured with a vitrified ceramic having at least 99.5 percent alumina and having a dielectric coefficient in the approximate range of 9.0 to 9.4.

13. The generator of claim 1, wherein said vitrified ceramic tube is manufactured with a mullite.

14. The generator of claim 1, wherein said vitrified ceramic has a dielectric coefficient greater than approximately 9.0.

15. The generator of claim 1, wherein said vitrified ceramic has a dielectric strength approximately 300–320 volts/mil.

16. The generator of claim 1, wherein said vitrified ceramic has a dielectric coefficient approximately in the 9.0 to 9.4 range and a dielectric strength approximately 300–320 volts/mil.

\* \* \* \* \*